United States Patent [19]

Sol

[11] Patent Number: 5,033,002
[45] Date of Patent: Jul. 16, 1991

[54] VEHICLE TRACTION CONTROLLER/ROAD FRICTION AND HILL SLOPE TRACKING SYSTEM

[75] Inventor: David Sol, Dearborn, Mich.

[73] Assignee: Ford Motor Company, Dearborn, Mich.

[21] Appl. No.: 535,630

[22] Filed: Jun. 11, 1990

[51] Int. Cl.$^5$ .............................................. B60T 8/24
[52] U.S. Cl. ................................ 364/426.03; 180/197; 303/95
[58] Field of Search ..................... 364/426.02, 426.03, 364/426.04; 303/97, 99; 180/197

[56] References Cited

U.S. PATENT DOCUMENTS

| | | | |
|---|---|---|---|
| 4,188,075 | 2/1980 | Rajput et al. | 303/106 |
| 4,451,096 | 5/1984 | Gygax | 303/109 |
| 4,484,280 | 11/1984 | Brugger et al. | 364/426.04 |
| 4,489,382 | 12/1984 | Jonner et al. | 364/426.02 |
| 4,562,542 | 12/1985 | Skarvada | 364/426.02 |
| 4,693,522 | 9/1987 | Wupper et al. | 303/105 |
| 4,717,207 | 1/1988 | Kubota et al. | 303/3 |
| 4,755,945 | 7/1988 | Kade et al. | 364/426.02 |
| 4,760,893 | 8/1988 | Sigl et al. | 364/426.03 |
| 4,763,260 | 8/1988 | Sakuma et al. | 364/426.02 |
| 4,829,438 | 5/1989 | Etoh | 364/426.04 |
| 4,842,342 | 6/1989 | Takahashi et al. | 303/102 |
| 4,855,917 | 8/1989 | Sawano et al. | 303/97 |
| 4,947,332 | 8/1990 | Ghoneim | 303/97 |

Primary Examiner—Thomas G. Black
Attorney, Agent, or Firm—Allan J. Lippa; Roger L. May

[57] ABSTRACT

A system and method for controlling vehicle traction uses estimates of external conditions from vehicle and engine measurements in a feedforward manner to control vehicle traction on slippery or changing surfaces and hills to compensate for external disturbances in an optimal manner. The present invention provides a dual feedforward/feedback system for a method of controlling vehicle traction. The method includes the step of generating a first feedforward value related to the slope of a hill and a second feedforward value related to the coefficient of friction of the load surface. The first and second feedforward values are then summed to generate a feedforward control value for controlling the level of vehicle traction. The system for controlling vehicle traction includes a first feedforward value related to the slope of a hill and a second feedforward value related to the coefficient of friction of the road surface. The first and second feedforward values are summed to generate a feedforward control value for controlling the level of vehicle traction.

18 Claims, 2 Drawing Sheets

VEHICLE TRACTION CONTROLLER/ROAD FRICTION AND HILL SLOPE TRACKING SYSTEM

BACKGROUND OF THE INVENTION

The present invention relates generally to vehicle traction control and, more particularly, to a system for and a method of controlling longitudinal vehicle traction on slippery surfaces and inclines.

It is well known in the industry that vehicle traction is heavily dependent on road surface conditions. However, the ever-changing road surface conditions are almost impossible to continuously monitor and measure, and even harder to apply to vehicle control systems which adjust vehicle braking and traction. Consequently, vehicle traction control devices typically adjust braking and traction based on arbitrary fixed targets which, since fixed, are at best a compromise for traction control on the various driving surfaces such as loose snow, packed snow, rain, wet leaves, and dry pavement.

In U.S. Pat. No. 4,484,280 issued to Brugger et al, a system directed to preventing undesired spinning of the driven vehicle wheels is disclosed. A threshold value for acceptable wheel spin is preset and the control system is activated only if one or more of the driven wheels is tending to spin at a rate which exceeds the threshold value. The system has a first control loop which reacts to the state of motion of the driven vehicle wheels and, when one of the wheels is tending to spin, that is, the acceptable threshold value has been exceeded, the wheel brake is activated. The system also has a second control loop which causes the output torque of the drive unit to be reduced in the event of a persisting tendency of the driven wheels on both sides of the vehicle to spin. However, the Brugger et al reference does not apply any external estimates, nor does it reflect environmental changes. Thus, the threshold value is not automatically adjusted for changes in external conditions.

In a co-pending, commonly assigned patent application, Ser. No. 07/535,678, filed June 11, 1990 external changes are estimated and made available to a variety of control devices in a vehicle. The estimating device estimates external conditions, most notably the coefficient of friction between a vehicle tire and a roadway, and the slope or grade of the hill the vehicle is attempting to climb or descend. From values of driven wheel spin of the vehicle, non-driven wheel spin of the vehicle, and wheel torque, the estimating device infers the value of the coefficient of friction and the hill slope. Instead of being imbedded in a brake control device or a traction control device, the estimator is a separate device which is capable of providing the determined values to a variety of vehicle control applications.

It is seen then that there is a need for a device which can utilize estimated external values of the coefficient of friction and hill slope in a feedforward manner to control vehicle traction on slippery or changing surfaces and hills to compensate for external disturbances in an optimal manner.

SUMMARY OF THE INVENTION

The present invention meets this need by providing a dual feedforward/feedback system for and method of controlling vehicle traction on slippery surfaces and inclines. The system of the present invention compensates for external or environmental disturbances. It also allows for the optimization of longitudinal vehicle acceleration by regulating wheel spins to the optimum safe value for any road condition, in accordance with road surface changes such as slippery conditions and hills.

In one embodiment of the present invention, a traction control method for a vehicle being driven on a road surface comprises the steps of: generating a first disturbance value related to the slope of a hill; generating a second disturbance value related to the coefficient of friction of the road surface; generating reference feedforward values; summing the first and second disturbance values and said reference feedforward values to generate a feedforward control value; generating error values; summing said feedforward control value and said error values to generate an optimum throttle position value; and controlling the level of vehicle traction in response to the optimum throttle position value to increase the vehicle traction by controlling the vehicle engine and wheels.

An advantage of the above method is that vehicle longitudinal traction on slippery surfaces and inclines is controlled by compensating for external environmental disturbances, such as hill slope and road surface coefficient of friction, on which vehicle traction is heavily dependent. This allows for the optimization of longitudinal vehicle acceleration by regulating wheel spin to the optimum safe value for any road condition.

In a further aspect of the present invention, a traction control method for a vehicle being driven on a road surface comprises the steps of measuring a variety of vehicle and engine parameters including: vehicle velocity to generate a first feedback signal; wheel spin error of driven wheel to generate a second feedback signal; and driven wheel speed to generate a third feedback signal. The method includes the additional steps of: determining reference signals for generating a reference velocity feedforward value, a reference wheel spin feedforward value, and a reference driven wheel spin feedforward value; estimating a coefficient of friction of the road surface signal; estimating a hill slope of the road surface signal; summing the reference feedforward values, the coefficient of friction of the road surface signal, and the hill slope of the road surface signal to generate a first feedforward value; summing the first feedback signal and the reference velocity signal and applying the summation to a first gain to generate a velocity error value; summing the second feedback signal and the reference wheel spin error signal and applying the summation to a second gain to generate a wheel spin error value; summing the third feedback signal and the reference driven wheel speed signal and applying the summation to a third gain to generate a driven wheel speed error value; summing the error values and the first feedforward value to generate an optimum throttle position value; and controlling the level of vehicle traction in response to the optimum throttle position value to improve the vehicle traction.

An advantage of this particular aspect of the invention is that regulation, tracking, and optimization features are provided as part of the traction control system, which ultimately results in optimum vehicle safety and performance for any road condition. Instead of controlling to arbitrary fixed targets which can only be a compromise for traction control, the present invention provides a method of vehicle traction control which tracks road friction and hill slope from vehicle and engine measurements.

The present invention further provides a system for controlling the traction of a vehicle being driven on a non-uniform road surface. The system comprises: means for generating a first disturbance value related to the slope of a hill; means for generating a second disturbance value related to the coefficient of friction of the road surface; means for generating reference feedforward gains; means for summing the first and second disturbance values and the reference feedforward gains to generate a feedforward control value; means for generating error values; means for summing the feedforward control value and the error values to generate an optimum throttle position value; and means for controlling the level of vehicle traction in response to the optimum throttle position value to increase the vehicle traction by controlling the vehicle engine and wheels.

In a further aspect of the invention, a system for controlling the traction of a vehicle being driven on a non-uniform road surface comprises: means for measuring vehicle conditions to generate a first feedback signal, a second feedback signal, and a third feedback signal; means for determining reference signals for generating a reference velocity feedforward value, a reference wheel spin feedforward value, and a reference driven wheel spin feedforward value; means for estimating a coefficient of friction of the road surface signal; means for estimating a hill slope of the road surface signal; means for summing the reference feedforward values, the coefficient of friction of the road surface signal, and the hill slope of the road surface signal to generate a first feedforward value; means for summing the first feedback signal and the reference vehicle velocity signal to generate a velocity error value; means for summing the second feedback signal and the reference wheel spin error signal to generate a wheel spin error value; means for summing the third feedback signal and the reference driven wheel speed error signal to generate a driven wheel speed error value; means for summing the error values and the first feedforward value to generate an optimum throttle position value; and means for controlling the level of vehicle traction in response to the optimum throttle position value to improve the vehicle traction.

An advantage of the traction control system of the present invention is that it can utilize estimated external values of the coefficient of friction and hill slope in a feed forward manner to optimally control vehicle traction on slippery or changing surfaces and hills to compensate for external disturbances in an optimal manner.

Other objects and advantages of the invention will be apparent from the following description, the accompanying drawings and the appended claims.

DESCRIPTION OF THE PREFERRED EMBODIMENT

Figure 1:
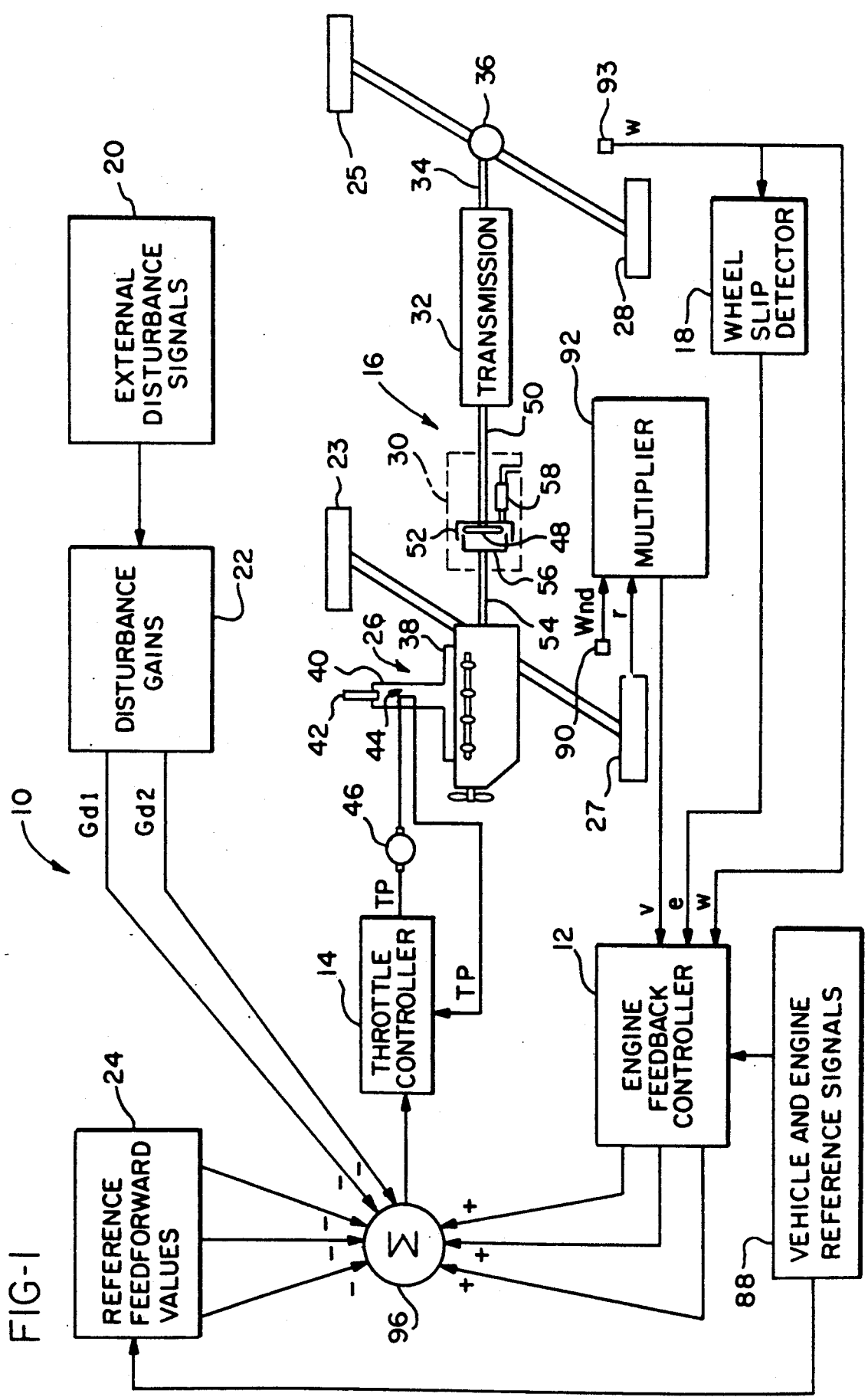
FIG. 1 is a schematic showing a conventional motor vehicle utilizing the traction control system described herein.

Referring first to FIG. 1, reference number 10 generally refers to a schematic of a motor vehicle controlled by the vehicle traction control system described herein. In general terms which are described in greater detail hereinafter, engine feedback controller 12 and throttle controller 14 are shown as feedback control systems receiving inputs from, and controlling motor vehicle 16 when detected wheel slip at wheel slip detector 18 indicates that the wheel slip error is not at an optimum value, as caused by external tractive disturbances 20 or excessive torque applied to the wheels, or both.

Disturbance gains 22 and reference feedforward gains 24 are used to compensate for or counteract the external disturbances 20, such as variations in hill slope and road surface coefficient of friction, in a feedforward manner. In this way, the regulation, tracking, and optimization of the vehicle traction can be anticipated and controlled for any road condition by compensating for external or environmental disturbances 20. As a result, the longitudinal vehicle acceleration can be optimized for any road condition by regulating wheel spin to the optimum value.

Motor vehicle 16 is shown in this particular example as having four wheels, 23, 25, 27, and 28, and an internal combustion engine 26 coupled to drive wheel 28 via clutch 30, automatic transmission 32, driveshaft 34, and differential/axle 36. Engine 26 is shown in this example as including an intake manifold 38 for inducting an air/fuel mixture therein via air/fuel intake 40. Fuel injector 42, shown as a portion of a central fuel injected system in this example, injects fuel into air/fuel intake 40. Throttle plate 44 is shown here actuated by servo motor 46 in response to throttle controller 14 for adjusting flow through the air/fuel intake 40 in a conventional manner.

It is to be understood that the traction control system described herein may be used to advantage with any type of combustion engine such as, for example, carbureted engines, multiport fuel injected engines, and direct fuel injected engines. Further, the traction control system is not limited to automobiles, but may be used to advantage with any apparatus having an engine coupled to a drive wheel.

Continuing with FIG. 1, clutch 30 is shown including clutch plates 48 coupled to transmission shaft 50, and friction elements 52 operably coupled to engine shaft 54 via clutch housing 56. Hydraulic piston 58 is shown coupled to friction elements 52 for coupling and decoupling clutch plates 48 to friction elements 52, thereby coupling and decoupling engine 26 to transmission 32. The amount of torque coupled from engine 26 to transmission 32 is controlled by slippage of clutch 30.

Figure 2:
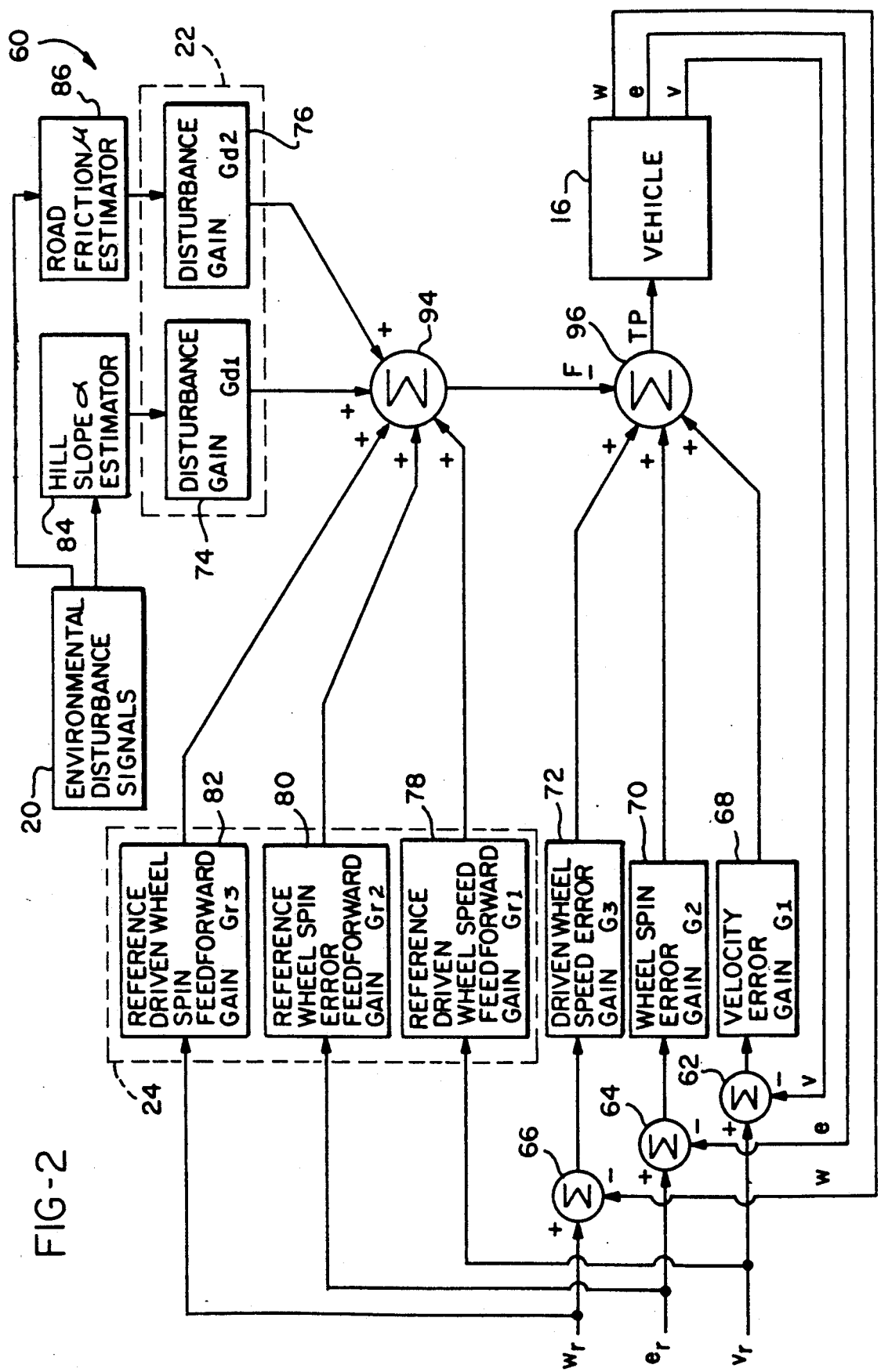
FIG. 2 is an electrical block diagram of the traction control system shown in FIG. 1.

Referring now to FIG. 2, and continuing with FIG. 1, traction control system 60 is shown schematically as a block diagram of computational and measurement steps represented as blocks. Each block shown herein describes an operation or step performed by the traction control system 60. It is noted that these operations may also be performed by discrete components wherein each block comprises an array of circuits such as, for example, integrated circuit adders and multipliers.

The block diagram of FIG. 2 illustrates a method of controlling vehicle traction on slippery surfaces and hills. Vehicle measurements of velocity, wheel slip error of the driven wheel 28, and driven wheel speed are compared to reference values of velocity, wheel slip error of the driven wheel 28, and driven wheel speed, respectively, at summers 62, 64, and 66, respectively, and then used in conjunction with feedback gains $G_1$, $G_2$, and $G_3$, at blocks 68, 70, and 72, respectively, to generate error values. Additionally, disturbance values 74 and 76 are determined by multiplying disturbance signals Alpha and Mu from blocks 84 and 86 by gains $Gd_1$ and $Gd_2$, respectively. Finally, feedforward gains $Gr_1$, $Gr_2$, and $Gr_3$ are multiplied by reference signals at blocks 78, 80, and 82, respectively.

Using estimates of external environmental conditions, such as a first disturbance signal for hill slope at block 84 and a second disturbance signal for road surface coefficient of friction at block 86, the values determined at blocks 74, 76, 78, 80, and 82 are used to counteract or compensate for the external disturbance signals at blocks 84 and 86, in a feedforward manner. The hill slope estimator 84 and the road surface coefficient of friction estimator 86 are shown and described in more detail in commonly assigned U.S. patent application, Ser. No. 07/535,678, filed June 11, 1990 the specification of which is hereby incorporated by reference.

Continuing with FIGS. 1 and 2, measurements of the vehicle velocity v, the wheel slip error e of the driven wheel 28, and the driven wheel speed w are applied to the engine feedback controller 12 as a first feedback signal, a second feedback signal, and a third feedback signal, respectively. In addition, predetermined reference signals $v_r$, $e_r$, and $w_r$ are provided to both the engine feedback controller 12 and the reference feedforward gain block 24, as shown by block 88 in FIG. 1.

In a preferred embodiment of the present invention, the first feedback signal, the vehicle velocity v, is determined by multiplying a non-driven wheel speed $w_{nd}$ measured at a non-driven wheel sensor 90 with a measured wheel radius r at multiplier 92. The wheel slip error e, which is the second feedback signal, is determined by providing the driven wheel speed signal w to the wheel slip detector 18. Finally, the third feedback signal, the driven wheel speed w, is determined directly from the driven wheel sensor 93. The negative of the measured values v, e, and w are then summed with the reference values $v_r$, $e_r$, and $w_r$ at summers 62, 64, and 66, respectively, and multiplied by a first gain $G_1$, a second gain $G_2$, and a third gain $G_3$, respectively, at blocks 68, 70, and 72, to provide feedback error values.

The predetermined reference signals $v_r$, $e_r$, and $w_r$ are also used to determine the reference feedforward values by applying the reference signals to gains $Gr_1$, $Gr_2$, and $Gr_3$, at blocks 78, 80 and 82, respectively. These values are summed at summer 94 with the disturbance values from blocks 74 and 76. The negative of the resulting value at summer 94 is then added to the feedback error values at summer 96 to provide an optimum throttle position value TP. The calculated optimum throttle position value TP is supplied to the servo motor 46 to adjust the position of the throttle plate 44 in response to the calculated optimum throttle Position TP. In this way, the level of vehicle traction Tv is controlled in response to the optimum throttle position value.

The first summer 94 sums the reference velocity feedforward value, the reference wheel spin feedforward value, the reference driven wheel spin feedforward value, the hill slope signal from block 84, and the coefficient of friction signal from block 86, to generate a first feedforward value F. The second, third, and fourth summers, 62, 64, and 66, respectively, generate the velocity error value, the wheel spin error value, and the driven wheel speed error value. These error values are then applied to the fifth summer 96 where they are summed with the feedforward value F to generate an optimum throttle position value TP. The level of vehicle traction can then be controlled in response to the optimum throttle position value.

The traction control system 60 uses vehicle measurements to calculate feedback error values and uses reference values to provide feedforward values. The system is responsive to estimated external conditions in order to optimally control vehicle longitudinal traction on slippery surfaces and inclines. Disturbance values and reference feedforward values are then used to counteract or compensate for these external conditions in a feedforward manner.

Having described the invention in detail and by way of reference to preferred embodiments thereof, it will be apparent that other modifications and variations are possible without departing from the scope of the invention defined in the appended claims.

What is claimed is:

1. A traction control method for a vehicle having an engine, wheels, an axle, a throttle, and brakes, the vehicle being driven on a road surface having a coefficient of friction and at least one hill slope, the method comprising the steps of:
   generating a first disturbance value related to the slope of the hill;
   generating a second disturbance value related to the coefficient of friction of the road surface;
   summing said first and second disturbance values to generate a feedforward control value; and
   controlling the level of vehicle traction in response to said feedforward control value by controlling the engine and the wheels.

2. A traction control method as claimed in claim 1 wherein said first disturbance value is determined by a hill slope estimator.

3. A traction control method as claimed in claim 1 wherein said second disturbance value is determined by a road surface coefficient of friction estimator.

4. A traction control method as claimed in claim 1 wherein said step of controlling the level of vehicle traction further includes the step of regulating wheel spin.

5. A traction control method for a vehicle having an engine, wheels, an axle, a throttle, and brakes, the vehicle being driven on a road surface having a coefficient of friction and at least one hill slope, the method comprising the steps of:
   generating a first disturbance value related to the slope of a hill;
   generating a second disturbance value related to the coefficient of friction of the road surface;
   generating reference feedforward gains;
   summing said first and second disturbance values and said reference feedforward gains to generate a feedforward control value;
   generating error values relating to driven wheel speed, wheel spin, and velocity;
   summing said feedforward control value and said error values to generate an optimum throttle position value; and
   controlling the level of vehicle traction in response to said optimum position value.

6. A traction control method for a vehicle having an engine, wheels, an axle, a throttle, and brakes, the vehicle being driven on a road surface having a coefficient of friction and at least one hill slope, the method comprising the steps of:
   measuring vehicle velocity to generate a first feedback signal;
   measuring wheel spin error of driven wheel to generate a second feedback signal;

measuring driven wheel speed to generate a third feedback signal;

determining a reference vehicle velocity signal for generating a reference velocity feedforward value;

determining a reference wheel spin error signal to generate a reference wheel spin feedforward value;

determining a reference driven wheel speed signal to generate a reference driven wheel spin feedforward value;

estimating a hill slope of the road surface from a first disturbing signal to generate a first disturbance value;

estimating a coefficient of friction of the road surface value from a second disturbance signal to generate a second disturbance value;

summing said reference velocity feedforward value, said reference wheel spin feedforward value, said reference driven wheel spin feedforward value, said first disturbance value, and said second disturbance value, to generate a first feedforward value;

summing said first feedback signal and said reference vehicle velocity signal to produce a first sum and applying said first sum to a first gain to generate a velocity error value;

summing said second feedback signal and said reference wheel spin error signal to produce a second sum and applying said second sum to a second gain to generate a wheel spin error value;

summing said third feedback signal and said reference driven wheel speed signal to produce a third sum and applying said third sum to a third gain to generate a driven wheel speed error value;

summing said velocity error value, said wheel spin error value, said driven wheel speed error value, and said first feedforward value to generate an optimum throttle position value; and controlling the level of vehicle traction in response to said optimum throttle position value.

7. A traction control method as claimed in claim 6 wherein the step of measuring the vehicle velocity further includes the steps of measuring non-driven wheel speed, measuring wheel radius, and multiplying said measured non-driven wheel speed and said wheel radius to provide said vehicle velocity.

8. A traction control method as claimed in claim 6 wherein the step of measuring the wheel spin error further includes the step of providing a wheel slip detector to determine wheel spin.

9. A traction control method as claimed in claim 6 wherein the step of measuring the driven wheel speed further includes the step of providing a driven wheel speed sensor to determine said driven wheel speed.

10. A traction control method for a vehicle having an engine, wheels, an axle, a throttle, and brakes, the vehicle being driven on a road surface having a coefficient of friction and at least one hill slope, the method comprising the steps of:

measuring vehicle velocity to generate a first feedback signal v;

measuring wheel spin error of driven wheel to generate a second feedback signal e;

measuring driven wheel speed to generate a third feedback signal w;

determining a reference vehicle velocity signal $v_r$ for generating a reference velocity feedforward value;

determining a reference wheel spin error signal $e_r$ for generating a reference wheel spin feedforward value;

determining a reference driven wheel speed signal $w_r$ for generating a reference driven wheel spin feedforward value;

estimating a hill slope of the road surface signal, Alpha;

estimating a coefficient of friction of the road surface signal, Mu;

summing said reference velocity feedforward value, said reference wheel spin feedforward value, said reference driven wheel spin feedforward value, said hill slope of the road surface signal, and said coefficient of friction of the road surface signal, to generate a first feedforward value F;

summing said first feedback signal v and said reference vehicle velocity signal $v_r$ to produce a first sum and applying said first sum to a first gain $G_1$ to generate a velocity error value;

summing said second feedback signal e and said reference wheel spin error signal $e_r$ to produce a second sum and applying said second sum to a second gain $G_2$ to generate a wheel spin error value;

summing said third feedback signal w and said reference driven wheel speed signal $w_r$ to produce a third sum and applying said third sum to a third gain $G_3$ to generate a driven wheel speed error value;

summing said velocity error value, said wheel spin error value, said driven wheel speed error value, and said first feedforward value F to generate an optimum throttle position value TP, and controlling the level of vehicle traction Tv in response to said optimum throttle position value TP.

11. A system for controlling the traction of a vehicle having an engine, wheels, an axle, a throttle, and brakes, the vehicle being driven on a road surface having a coefficient of friction and at least one hill slope, comprising:

means for generating a first disturbance value related to the slope of the hill;

means for generating a second disturbance value related to the coefficient of friction of the road surface;

means for summing said first and second disturbance values to produce a feedforward control value; and means for controlling the level of vehicle traction in response to said feedforward control value.

12. A system for controlling the traction of a vehicle as claimed in claim 11 wherein said means for generating a first disturbance value comprises a hill slope estimator.

13. A system for controlling the traction of a vehicle as claimed in claim 11 wherein said means for generating a second disturbance value comprises a road surface coefficient of friction estimator.

14. A system for controlling the traction of a vehicle as claimed in claim 11 wherein said means for controlling the level of vehicle traction comprises means for regulating wheel spin.

15. A system for controlling the traction of a vehicle having an engine, wheels, an axle, a throttle, and brakes, the vehicle being driven on a road surface having a coefficient of friction and at least one hill slope, comprising:

means for generating a first disturbance value related to the slope of a hill;

means for generating a second disturbance value related to the coefficient of friction of the road surface;

means for generating reference feedforward gains;

means for summing said first and second disturbance values and said reference feedforward gains to generate produce a feedforward control value;

means for generating error values relating to driven wheel speed, wheel spin, and velocity;

means for summing said feedforward control value and said error values to produce an optimum throttle position value; and means for controlling the level of vehicle traction in response to said optimum throttle position value.

16. A system for controlling the traction of a vehicle having an engine, wheels, an axle, a throttle, and brakes, the vehicle being driven on a road surface having a coefficient of friction and at least one hill slope, comprising:

means for measuring vehicle velocity to generate a first feedback signal;

means for measuring wheel spin error of driven wheel to generate a second feedback signal;

means for measuring driven wheel speed to generate a third feedback signal;

means for determining a reference vehicle velocity signal for generating a reference velocity feedforward value;

means for determining a reference wheel spin error signal for generating a reference wheel spin feedforward value;

means for determining a reference driven wheel speed signal for generating a reference driven wheel spin feedforward value;

means for estimating a hill slope of the road surface from a first disturbance signal to generate a first disturbance value;

means for estimating a coefficient of friction of the road surface value from a second disturbance signal to generate a second disturbance value;

means for summing said reference velocity feedforward value, said reference wheel spin feedforward value, said reference driven wheel spin feedforward value, said first disturbance value, and said second disturbance value, to generate a first feedforward value;

means for summing said first feedback signal and said reference vehicle velocity signal to produce a first sum and applying said first sum to a first gain to generate a velocity error value;

means for summing said second feedback signal and said reference wheel spin error signal to produce a second sum and applying said second sum to a second gain to generate a wheel spin error value;

means for summing said third feedback signal and said reference driven wheel speed signal to produce a third sum and applying said third sum to a third gain to generate a driven wheel speed error value;

means for summing said velocity error value, said wheel spin error value, said driven wheel speed error value, and said first feedforward value to produce an optimum throttle position value; and means for controlling the level of vehicle traction in response to said optimum throttle position value.

17. A traction control system for a vehicle having an engine, wheels, an axle, a throttle, and brakes, the vehicle being driven on a road surface having a coefficient of friction and at least one hill slope, the system comprising:

means for generating a first disturbance value relates to the slope of a hill;

means for generating a second disturbance value related to the coefficient of friction of the road surface;

a summer for summing said first and second disturbance values to produce an optimum throttle position value; and a means for controlling the level of vehicle traction in response to said optimum throttle position value to regulate the vehicle traction.

18. A traction control system as claimed in claim 17 wherein said means for generating a first disturbance value comprises a hill slope estimator and said means for generating a second disturbance value comprises a road surface coefficient of friction estimator.

* * * * *